(No Model.)
E. J. POPE.
STRAINER FOR FLUIDS.
No. 358,749. Patented Mar. 1, 1887.
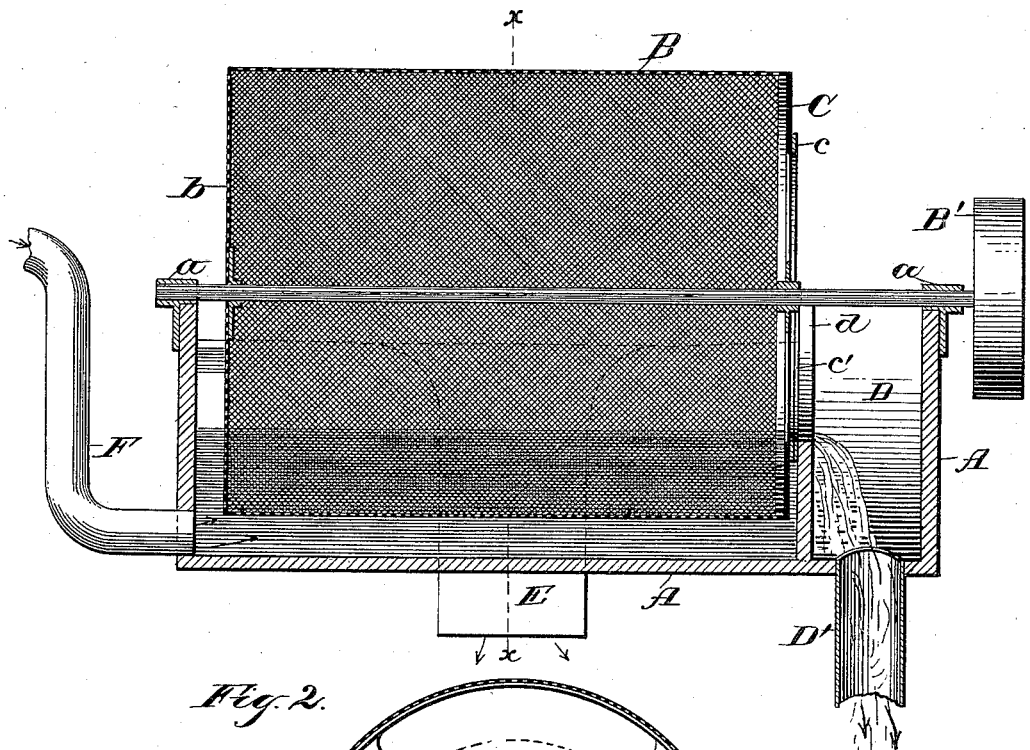
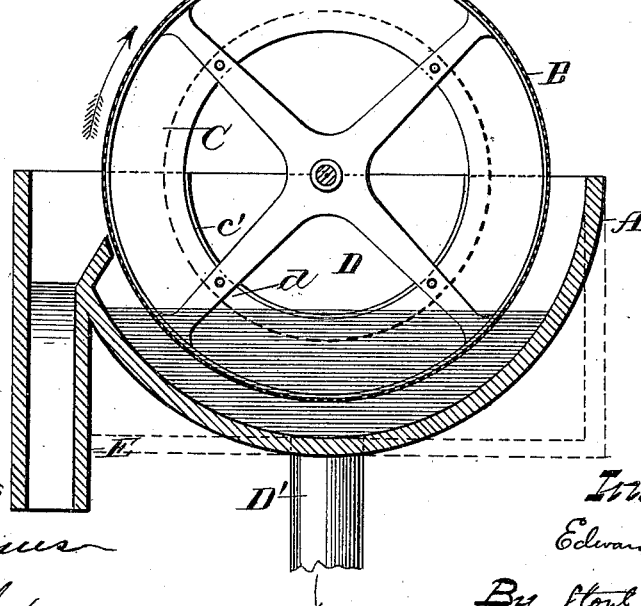
Witnesses
E. G. Samus
G. A. Platz
Inventor:
Edward J. Pope
By Stout & Underwood
Attorneys.

UNITED STATES PATENT OFFICE.

EDWARD J. POPE, OF EAU CLAIRE, WISCONSIN.

STRAINER FOR FLUIDS.

SPECIFICATION forming part of Letters Patent No. 358,749, dated March 1, 1887.

Application filed February 5, 1886. Serial No. 190,884. (No model.)

*To all whom it may concern:*

Be it known that I, EDWARD J. POPE, of Eau Claire, in the county of Eau Claire, and in the State of Wisconsin, have invented certain new and useful Improvements in Strainers for Fluids; and I do hereby declare that the following is a full, clear, and exact description thereof.

My invention relates to strainers for fluids, designed more particularly for use in paper-mills, and will be fully described hereinafter.

In the drawings, Figure 1 is a longitudinal vertical section through the center of my device, and Fig. 2 is a cross-section on line $x\,x$, Fig. 1.

A is a tank or box, having preferably a curved bottom, though it may be square, as shown in dotted lines in Fig. 2; and B is a wire-gauze cylinder, the shaft of which has its bearings $a\,a$ one in each end of the tank. The end $b$ of the cylinder B is closed either by a solid or reticulated diaphragm, while the opposite end of the cylinder is open on the center, but is closed on its inner edge by an annulus, C, and to this annulus is secured a packing-ring, $c$, for engagement with packing-strip $c'$ on the concaved partition $d$, which latter separates the main tank from a chamber, D, that empties through a pipe, D', that carries the strained fluid to its destination. The cylinder B is turned in the direction indicated by the arrow, Fig. 2, by a pulley, B', and the main tank is provided with a drip-spout, E.

The operation of my device is as follows: As the cylinder revolves the fluid is forced into the tank through the pipe F, and must pass through the meshes of the cylinder before it finds an outlet. This it will do, no matter how fine the meshes may be, and as the cylinder rises the fluid that adheres will trickle back to the drip-spout E and will constantly wash the outer surface of the cylinder and thus carry off the adhering matter that might otherwise close its meshes and thus impair its efficiency. Therefore, as my device is self-cleaning, it will require very little attention from one year's end to another.

Having thus described my invention, what I claim as new, and desire to secure by Letters Patent, is—

1. The combination, in a fluid-strainer, of a reticulated cylinder with a tank having a drip-spout the mouth of which is below the top of the tank and adjacent to the said cylinder the entire length of the latter, substantially as set forth.

2. The combination of a tank having concaved partition $d$ and packing-strip $c'$, with cylinder having annulus C and packing-ring $c$, as set forth.

3. The combination, in a fluid-strainer, of a tank having an inlet at one end and a concaved partition forming a chamber provided with an outlet at the other, a revolving cylinder located between the said inlet and partition, closed at one end and centrally open at the other end to correspond with the concavity in the partition, and a drip-spout having a mouth adjacent to the cylinder its entire length, substantially as set forth.

In testimony that I claim the foregoing I have hereunto set my hand, at Milwaukee, in the county of Milwaukee and State of Wisconsin, in the presence of two witnesses.

EDWARD J. POPE.

Witnesses:
S. S. STOUT,
MAURICE F. FREAR.